United States Patent [19]

Gurgiolo et al.

[11] 4,048,100

[45] Sept. 13, 1977

[54] POLYHALOGENATED POLYOLS AND FOAMED POLYURETHANES PREPARED FROM THEM

[75] Inventors: Arthur E. Gurgiolo; Llewellyn D. Booth, both of Lake Jackson, Tex.

[73] Assignee: The Dow Chemical Company, Midland, Mich.

[21] Appl. No.: 595,972

[22] Filed: July 14, 1975

Related U.S. Application Data

[62] Division of Ser. No. 462,143, April 18, 1974, abandoned.

[51] Int. Cl.$^2$ ............................................. C08G 18/14
[52] U.S. Cl. ...................... 260/2.5 AJ; 260/2.5 AM; 260/2.5 AQ
[58] Field of Search .................... 260/2.5 AQ, 2.5 AJ, 260/2.5 AM

[56] References Cited

U.S. PATENT DOCUMENTS

| | | | |
|---|---|---|---|
| 3,336,245 | 8/1967 | Britain | 260/2.5 AQ |
| 3,345,309 | 10/1967 | Merten et al. | 260/2.5 AQ |
| 3,470,118 | 9/1969 | Forster | 260/2.5 AQ |

*Primary Examiner*—Eugene C. Rzucidlo
*Attorney, Agent, or Firm*—Benjamin G. Colley

[57] ABSTRACT

Polyhalogenated polyols are prepared having the formula $(Q)_a-N(R)_b-[(CH_2)_cN(Q)]_d-(CH_2)_c$ OH wherein Q is 3-polyhalophenoxy-2-hydroxy-propyl; R is $-(CH_2)_c OH$ or $-(CH_2)_c CH_3$; $a$ is 1 or 2; $b$ is 0 or 1; $c$ is 1-4 and $d$ is 0 or 1 with the proviso that when $a$ is 2, $b$ is 0 and halo is promine or chlorine.

These polyols such as N,N-bis[3-(2',4'-dibromophenoxy)-2-hydroxypropyl]ethanolamine are used to make fire retardant rigid polyurethane foams using isocyanates, blowing agents, and the like.

12 Claims, No Drawings

POLYHALOGENATED POLYOLS AND FOAMED POLYURETHANES PREPARED FROM THEM

CROSS-REFERENCE TO RELATED APPLICATION

This is a divisional of application Ser. No. 462,143, filed Apr. 18, 1974, now abandoned.

BACKGROUND OF THE INVENTION

This invention relates to halogenated polyols and foamed polyurethanes prepared from them. More specifically, the invention relates to 1-polyhalophenoxy-3-amino-2-propanols having hydroxy alkyl substituents on the amine nitrogens and to foamed rigid polyurethanes made therefrom.

Monobromophenoxy-3-amino-2-propanols are known from U.S. Pat. No. 3,203,992.

SUMMARY OF THE INVENTION

It now has been discovered that polyhalogenated phenoxy amino propanols having two or more hydroxy groups and no free amine hydrogens unexpectedly impart superior fire retardant properties to rigid polyurethane foams.

The polyols of this invention have the formula (Q)$_a$—N(R)$_b$—[(CH$_2$)$_c$N(Q)]$_d$(CH$_2$)$_c$OH wherein Q is 3-polyhalophenoxy-2-hydroxy-propyl; R is —(CH$_2$)$_c$OH or —(CH$_2$)$_c$CH$_3$; $a$ is 1 or 2; $b$ is 0 or 1; $c$ is 1–4 and $d$ is 0 or 1 with the proviso that when $a$ is 2, $b$ is 0 and halo is bromine or chlorine.

The foamed polyurethane products of this invention comprise the reaction product of
1. a polyol having the above formula,
2. an aryl polyisocyanate,
3. a polyurethane blowing agent, and
4. a surfactant.

DETAILED DESCRIPTION

Suitable poly-halogenated polyols within the scope of the above formula and that are made in accordance with this invention are:
1-(2',4'-dibromophenoxy)-2-hydroxy-3-[(N-2-hydroxyethyl)ethylamino]propane;
1-(2',4'-dibromophenoxy)-2-hydroxy-3-[N,N-di(2-hydroxyethyl)amino]propane;
1-(3',4',5'-tribromophenoxy)-2-hydroxy-3-[N,N-di(2-hydroxyethyl)amino]propane;
1-(pentabromophenoxy)-2-hydroxy-3-[N,N-di(2-hydroxyethyl)amino]propane;
1-(pentachlorophenoxy)-2-hydroxy-3-[N,N-di(2-hydroxyethyl)amino]propane;
N,N-bis[3-(2',4'-dibromophenoxy)-2-hydroxypropyl]-ethanolamine;
N,N-bis[3-(2',4'-dichlorophenoxy)-2-hydroxypropyl]-ethanolamine;
N,N-bis[3(3',4',5'-tribromophenoxy)-2-hydroxypropyl]-ethanolamine;
N,N-bis[3(3',4',5'-trichlorophenoxy)-2-hydroxypropyl]-ethanolamine;
N,N,N'-tris[3-(2',4'-dibromophenoxy)-2-hydroxypropyl]-N'-(2-hydroxyethyl)ethylenediamine;
N,N,N'-tris[3-(2'4'-dichlorophenoxy)-2-hydroxypropyl]-N'-(2-hydroxyethyl)ethylenediamine;
N,N,N'-tris[3-(2',4' -2-hydroxypropyl]-N'-(3-hydroxypropyl)ethylenediamine;
N,N,N'-tris[3-(3',4',5'-tribromophenoxy)-2-hydroxypropyl]-N'-(2-hydroxyethyl)ethylenediamine;
N,N,N'-tris[3-(3',4',5'-trichlorophenoxy)-2-hydroxypropyl]-N'-(2-hydroxyethyl)ethylenediamine;
and mixtures thereof.

The above polyhalogenated polyols are prepared by reacting polyhalo phenyl glycidyl ethers with various hydroxy amines with one glycidyl ether equivalent for each free hydrogen on the amine.

Examples of suitable amines are ethanolamine, isopropanolamine, diisopropanolamine, 1-amino-2-butanol, 2-amino-1-butanol, 2-amino-3-butanol, 1-amino-3-propanol, 1-amino-4-butanol, aminoethyl ethanolamine, isopropanol ethylamine, ethanol propylamine and the like.

Any organic aryl polyisocyanate can be employed in making the polyurethane compositions of the present invention. The isocyanate may contain two or more isocyanate radicals. Mixtures of the aryl polyisocyanates can be employed. It is preferred that the organic polyisocyanates be non-complexed, i.e. that they be free from complexing with a polymer prepared from an unsaturated monomer.

Among representative polyisocyanate compounds are:
toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethyl-4,4'-diisocyanatodiphenyl,
3,3'-dimethoxy-4,4'-diisocyanatodiphenyl,
1,4-anthracenediisocyanate,
2,5-fluoroenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

The polyurethane foams prepared from the polyols of this invention with other polyols or polyesters and polymeric isocyanates such as polymethylene polyphenyl isocyanate PAPI have been found to possess superior resistance to burning than have foams made with the non-polymeric polyisocyanates, e.g. tolylene diisocyanate, under otherwise similar conditions.

In making the polyurethane foams of the invention, the proportions of the polyisocyanate compounds and the proportions of the polyols, or other compounds having active hydrogen atoms, can vary widely, but are usually employed in amounts corresponding to from about 0.9 to 2.0, preferably from 1.0 to 1.2 NCO group per active hydrogen atom in the mixture. One can provide water and excess polyisocyanate to form gases capable of expanding the reaction mass to make a foam. However, the polyurethane foams are preferably prepared employing aliphatic hydrocarbons boiling below 110° C. or halogenated aliphatic hydrocarbons boiling below 110° C. such as dichlorodifluoromethane, trichlorofluoromethane, hexane, hexene, or pentane as the blowing or foaming agent. Suitable foaming agents are disclosed in U.S. Pat. No. 3,072,582.

The polyisocyanates are usually employed in an amount in excess of that theoretically required to react with the hydrogen atoms in the sum of the reactants and water mixture of materials, e.g. from 0.9 to 2.0, preferably in an amount corresponding to from about 1.0 to 1.2 NCO group for each OH and active hydrogen atoms in the starting materials.

The polyurethane foams can be prepared by a prepolymer procedure, a one-shot, process, or a batch-wise technique, all of which methods are known to the art. The products are rigid to semi-rigid foams and have closed or open cells, but usually consist of predominately closed cells with a minor amount of open or interconnected cells.

In practice, the polyols as hereinbefore described are reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CH_2CCl_2$, $CCl_3F$, $CCl_2F_2$, $C_2Cl_2F_2$, $CH_2Cl_2$, $C_2H_4Cl_2$, $CHCl_2F$, $CClF_3$, and $CHClF_2$, or pentane, pentene, hexane, hexene, and heptane.

Among suitable catalysts are sodium acetate; amine catalysts such as tetramethylenediamine (TMDA), tetramethyl guanidine (TMG), tetramethylethylenediamine (TMEDA), tetramethyl-1,1,3,3-butanediamine (TMBDA), triethylenediamine (DABCO), triethylamine (TEA), dimethylethanolamine, N-ethyl morpholine, and N-ethyl piperidine; and esters of tin, or tin salts, such as stannous oleate, stannous octoate, and dibutyl tin dilaurate. Mixtures or combinations of any two or more of the catalysts can also be used.

The catalysts can be used in amounts corresponding to and from about 0.01 to 5 percent based on the total the sum of thesum of the weights of the polyols initially used.

If desired, suitable known fire retardants may be incorporated into the foam formulation. Examples of these are tris(dichloropropyl)phosphate, diethyl N,N-bis(2-hydroxyethyl)amino methyl phosphonate, tetrabromo bisphenol A, tetrabromophthalic anhydride, hexabromo benzene, 2,4,6-tribromophenol, tricresyl phosphate, triethyl phosphate, tributyl phosphate, dibromoneopentyl glycol, and the like.

Among surface active agents or emulsifiers there may be mentioned polypropylene glycols having molecular weights between 2000 and 8000, the liquid silicone-glycol copolymers having viscosities of from 350 to 3500 centistokes at 77° F., and polysiloxane polyoxyalkylene block copolymers as described in U.S. Pat. No. 2,834,748.

The following non-limiting examples are presented to illustrate the invention.

PREPARATION 1

A 1 liter pot, having three necks, was equipped with stirrer, thermometer, condenser, and separatory funnel. In the pot was put 106 g. (1.74 moles) of monoethanolamine and 100 g. of dioxane solvent. This was heated to 50° C. From the funnel was fed 420 g. (1.83 moles) of p-bromophenyl glycidyl ether. Exothermic reaction carried the temperature to 80°–90° C. where it was controlled by means of a water bath. The feed time was 40 minutes. The reaction product was digested at 85°–90° C. for 2 hours. Solvent and other volatiles were removed under reduced pressure on a rotating evaporator. There was recovered 500 g. of yellow viscous syrup which, on standing, solidified to a crystalline solid. This was identified as 40–60% mixture of 1-(40′-bromophenoxy)-2-hydroxy-3-(2-hydroxyethylamine)propane and N,N-bis[3-(p-bromophenoxy)-2-hydroxypropyl]ethanolamine.

EXAMPLE I

A glass reactor (citrate bottle) was loaded with reactants as follows:

2,4-dibromophenyl glycidyl ether 154 g. (0.5 mole)
Diethanolamine 54 g. (0.5) mole
Dioxane solvent 75 g.

The bottle was capped and put in a 100° C. autoclave for 18 hours. Then the bottle was cooled, opened and volatiles removed under reduced pressure. The product as a yellowish brown, very viscous syrup which was identified as 1-(2′,4′-dibromophenoxy)-2-hydroxy-3-[N,N-di(2-hydroxyethyl)amino]propane.

When the above 2,4-dibromophenyl glycidyl ether is replaced with 2,4-dichlorophenyl glycidyl ether, the corresponding chloro polyol is obtained.

EXAMPLE II

Into a 1 liter flask 145 g. (0.375 moles) of 2,4,6-tribromophenyl glycidyl ether was dissolved in 100 g. of dioxane solvent. In a separate flask, 39.4 g. (0.375 moles) of diethanolamine was dissolved in 40 g. of dioxane. The amine solution was warmed to 50° C. A third of the glycidyl ether solution was added to the amine solution and it was warmed to 90° C. for 15 minutes. The second third was then added and 5 minutes later the last third was added. The temperature was held at 90°–100° C. for 2 hours. Solvent and volatiles were then removed under reduced pressure. The yield was 185 g. of viscous syrup, which solidified on cooling. This was identified as 1-(2,4,6-tribromophenoxy)-2-hydroxy-3-[N,N-di(2-hydroxyethyl)amino]propane.

When the above tribromophenyl glycidyl ether is replaced with the trichloro analogue, the corresponding chloro polyols are obtained.

EXAMPLE III

Into a 1 liter flask was put 242 g. (0.75 moles) of pentachlorophenyl glycidyl ether and 200 g. of dioxane as solvent. The glycidyl ether was dissolved by gentle warming and shaking at 90° C. Separately, 79 g. (0.75 moles) of diethanolamine was dissolved in 50 g. of dioxane. The amine was then all added at once to the solution of glycidyl ether and mixed. A mild exotherm maintained the temperature at 87° C. for 20 minutes without external heat being applied. When the temperature started to drop, external heat was then applied and the temperature maintained at 90° C. for 2 hours. Volatiles and dioxane solvent were then removed under reduced pressure on a rotating evaporator. There was recovered 414.4 g. of viscous syrup. This solidified on cooling. This became putty-like at 70°–72° C. and fluid at 78–80° C. The product was identified as 1-(pentachlorophenoxy)-2-hydroxy-3-[N,N-di(2-hydroxyethyl)amine]propane.

By following the above procedures, the corresponding pentabromo polyol can be obtained.

EXAMPLE IV

Into a 500 ml. reaction flask was put 184 gms. (0.6 mole ) of 2,4-dibromophenyl glycidyl ether and 50 ml. of dioxane.

Then a total of 20.8 gms. (0.2 mole) of aminoethyl ethanolamine was placed in the flask in two portions. One third was added and the temperature was raised to 50° C. The reaction then produced an exotherm which raised the temperature to 80-90° C. during which the rest of the feed was added. The contents were digested at 90° C. for one hour after which the dioxane was removed under reduced pressure on a rotating evaporator to yield 200 gms. of a viscous syrup which when cooled produced a brittle yellowish resin. This was identified as N,N,N'-tris[3-(2',4'-dibromophenoxy)-2-hydroxypropyl]-N'-(2-hydroxyethyl)ethylene diamine.

EXAMPLE V

A 500 ml. pot was equipped with stirrer, thermometer, condenser and separatory funnel. In the pot was put 154 g. (0.5 mole) of 2',4'-dibromophenyl glycidyl ether. In the separatory funnel was put 15.2 g. (0.25 mole) of monoethanolamine.

The above glycidyl ether was warmed to 50° C. and the ethanolamine was slowly fed in over a 15 minute period. Reaction became very exothermic and cooling was needed to hold the temperature at 80° C. The product, at the end of the feed, became very viscous and it was poured into a sample bottle while hot and molten. Reaction was essentially quantitative. The product was identified as N,N-bis[3-(2',4'-dibromophenoxy)-2-hydroxypropyl]ethanol amine.

EXAMPLE VI-IX

| Ingredients | Foam Formulations | | | | |
|---|---|---|---|---|---|
| | Control | Ex. VI | Ex. VII | Ex. VIII | Ex. IX |
| Preparation I polyol (gms) | 75 | | | | |
| Example I polyol (gms) | | 75 | | | |
| Example II polyol (gms) | | | 75 | | |
| Example III polyol (gms) | | | | 75 | |
| Example IV polyol (gms) | | | | | 75 |
| 17% Freon 11-gms (blowing agent) | 48.5 | 26.2 | 24.2 | 25.8 | 30.0[4] |
| 1% DC-193[1]-gms (surfactant) | 2.85 | 1.54 | 1.42 | 1.52 | 1.2 |
| 7.5% TEP[2]-gms | 21.5 | 11.5 | 10.6 | 11.4 | 15.0[5] |
| 1.05 eq. PAPI[3]-gms | 110.0 | 79.0 | 67.0 | 77.0 | 43.0 |

Notes: Percentages based on total weight of polyol and isocyanate.
[1]A methyl siloxane polyoxyethylene copolymer made by Dow Corning.
[2]Triethylphosphate.
[3]PAPI is a 2.6 functional polymethylene poly-phenylisocyanate having a NCO equivalent weight of 134.
[4]25.5% Freon based on polyol and isocyanate.
[5]12.7% TEP based on polyol and isocyanate.

PROCEDURE

To a polyethylene beaker was added triethylphosphate (TEP) then a hot polyol (100° C.) of the above formulations was stirren in. Next the surfactant was added. To this mixture Freon 11 was added with stirring until the mixture had cooled off and the desired level of Freon was reached. To a second beaker was added the polymeric isocyanate (PAPI). The two components were quickly added together and mixed vigorously with a spatula until the mixture began to cream. The mixture was then poured into a gallon ice cream carton and allowed to foam. The cream time and foam time for each formulation is set forth below.

| | Control | Ex. VI | Ex. VII | Ex. VIII | Ex. IX |
|---|---|---|---|---|---|
| Cream time | instant | 25 sec. | 26 sec. | 26 sec. | N.A. |
| Foam time | >10 min* | 150 " | 160 " | 155 " | N.A. |

*Placed in oven at 140° F. to cure.

It was impossible to prepare a comparable foam from the control that was equivalent to those prepared with Examples VI-IX because of the instant creaming as the two components were poured together. The active hydrogen left on the amine of the control material is apparently responsible. Also after the initial creaming reaction stops, the foaming reaction of the control also comes to almost a standstill. This is again apparently caused by the active hydrogen left on the amine group. As the amine reacts with the polymeric isocyanate, urea linkages are formed. Urea is not a good catalyst for the urethane reaction, thus the amine is used up and the reaction comes to a stop. In the case of the control foam, the creaming mixture was placed in an oven for 3 hours at 140° F. to help cure it.

The following physical properties were obtained:

| | Control | Ex. VI | Ex. VII | Ex. VIII | Ex. IX |
|---|---|---|---|---|---|
| Density pds/cu.ft. | 3.59 | 2.03 | 2.13 | 2.24 | 2.02 |
| Bureau of Mines test No. 6316 (burn through time in minutes) | 1.75 | 2.0 | 16.0 | 7.0 | 1.5 |
| ASTM 1692-67 (inches burned in 60 seconds) | 0.88 | 0.76 | 0.62 | 0.69 | 1.2 |
| Extinguish time (sec.) | 60.0 | 43.8 | 40.8 | 44.0 | 40.0 |

Considering the higher density of the control and its combustion properties, it is inferior to all the other Examples.

EXAMPLES X - XIV

| Ingredients | Ex. X | Ex. XI | Ex. XII | Ex. XIII | Ex. XIV |
|---|---|---|---|---|---|
| Example I polyol (gms) | 100 | 80.5 | 69.6 | 88.7 | 84.1 |
| Example V polyol (gms) | | | 30.4 | | |
| RS 530[1](gms) | | | | | 15.9 |
| RA 800[2](gms) | | | | 11.5 | |
| Freon 11 (gms) | 38.8 | 39.1 | 36.1 | 40.4 | 30.5 |
| DC-193 (gms) | 2.0 | 2.1 | 1.9 | 2.2 | 2.0 |
| Fire Retardant Additive (gms) | 15.5[4] | 19.6[5] | 14.5[4] | 16.2[4] | 15.6[6] |
| Catalyst[3](gms) | 0.013 | 0.013 | 0.012 | 0.013 | 0.04 |
| 1.05 eq. PAPI (gms) | 107.2 | 108.1 | 93.5 | 118.1 | 109.0 |

Notes:
[1]Voranol®RS-530, the reaction product of sucrose and propylene oxide having an average functionality of 8 and an OH equivalent weight of about 105.
[2]Voranol®RA-800, an amine polyol having an average functionality of 4 and an OH equivalent weight of about 70.
[3]Dibutyl tin dilaurate
[4]Tris(chloroethyl)phosphate
[5]Diethyl N,N-bis(2-hydroxyethyl)aminomethyl phosphonate
[6]Fryol 99®, a chlorinated polyphosphate having 14% phosphorus and 26% chlorine.

The procedure for making foam samples from these formulations was the same as that set forth in Examples VI – IX. The following physical properties were obtained:

| | Examples | | | | |
|---|---|---|---|---|---|
| | X | XI | XII | XIII | XIV |
| Density (lbs/cu. ft.) | 1.75 | 1.53 | 1.67 | 1.75 | 2.1 |
| Bureau of Mines Test 6316 (Burn through in minutes) | 2.2 | 8.3 | 4.8 | 3.6 | 13.6 |
| Butler Chimney Test[1] % retained | 71 | 71 | 71 | 75 | 69 |

[1]The Butler Chimney Test is reported in Journal of Cellular Plastics, November 1967, pp 497-501.

The above examples show that the polyols of the invention can be used together or blended with other non-fire retardant polyols to prepare excellent fire retardant foams.

We claim:

1. A semi-rigid to rigid foamed polyurethane product having predominantly closed cells which comprises the reaction product of
   1. a polyol having the formula

$(Q)_a-N(R)_b-[(CH_2)_cN(Q)]_d(CH_2)_cOH$ wherein Q is 3-polyhalophenoxy-2-hydroxypropyl; R is $-(CH_2)_c$ OH or $-(CH_2)_c CH_3$; $a$ is 1 or 2; $b$ is 0 or 1; $c$ is 2–4 and $d$ is 0 or 1 with the proviso that when $a$ is 2, $b$ is 0 and halo is bromine or chlorine,
   2. an aryl polyisocyanate,
   3. a polyurethane blowing agent, and
   4. a surfactant, wherein said polyisocyanate is used in amounts corresponding to from 0.9 to 2.0 NCO groups for each active hydrogen atom in the mixture of reactive materials.

2. A foamed polyurethane product as claimed in claims 1 wherein the polyol is N,N-bis[3-(2′,4′-dibromophenoxy)-2-hydroxypropyl]ethanolamine.

3. A foamed polyurethane product as claimed in claim 1 wherein the polyol is 1-(2′,4′-dibromophenoxy)-2-hydroxy-3-[N,N-di(2-hydroxyethyl)amino]propane.

4. A foamed polyurethane product as claimed in claim 1 wherein the polyisocyanate is polymethylene polyphenylisocyanate.

5. A foamed polyurethane product as claimed in claim 1 wherein the blowing agent is water, hydrocarbons boiling below 110° C. or halohydrocarbons boiling below 110° C.

6. A foamed polyurethane product as claimed in claim 1 wherein the polyisocyanate is used in amounts corresponding to 1.0 to 1.2 NCO groups for each active hydrogen atom in the mixture of reactive materials.

7. A foamed polyurethane product as claimed in claim 1 wherein the polyol is 1-(2′,4′-dichlorophenoxy)-2-hydroxy-3-[N,N-di(2-hydroxyethyl)amino] propane.

8. A foamed polyurethane product as claimed in claim 1 wherein the polyol is 1-(2,4,6-tribromophenoxy)-2-hydroxy-3-[N,N-di(2-hydroxyethyl)amino] propane.

9. A foamed polyurethane product as claimed in claim 1 wherein the polyol is 1-(2,4,6-trichlorophenoxy)-2-hydroxy-3-[N,N-di(2-hydroxyethyl)amino] propane.

10. A foamed polyurethane product as claimed in claim 1 wherein the polyol is 1-(pentachlorophenoxy)-2-hydroxy-3-[N,N-di(2-hydroxyethyl)amine] propane.

11. A foamed polyurethane product as claimed in claim 1 wherein the polyol is 1-(pentachlorophenoxy)-2-hydroxy-3-[N,N-di(2-hydroxyethyl)amine] propane.

12. A foamed polyurethane product as claimed in claim 1 wherein the polyol is N,N,N′-tris[3-(2′,4′-dibromo-phenoxy)-2-hydroxypropyl]-N′-(2-hydroxyethyl) ethylene diamine.

* * * * *

UNITED STATES PATENT AND TRADEMARK OFFICE
CERTIFICATE OF CORRECTION

PATENT NO. : 4,048,100  
DATED : September 13, 1977  
INVENTOR(S) : A. E. Gurgiolo and L. D. Booth Page 1 of 2

It is certified that error appears in the above-identified patent and that said Letters Patent are hereby corrected as shown below:

In the abstract, Line 2, the formula reads "...$-CH_2)_e OH$--" please change to --...$-(CH_2)_c OH$--.

In the abstract, Line 6, please change "promine" to --bromine--.

Col. 1, Line 65, please change this to read --N,N,N',tris [3-(2',4'-dichlorophenoxy)-2-hydroxypropyl]-N'-(3-hydroxy- --.

Col. 2, Line 42, please change this to read --2,5-fluorenediisocyanate--.

Col. 2, Line 58, please add quotation marks before and after "PAPI".

Col. 3, Line 18, please delete comma (,) after "shot".

Col. 3, Line 38, please add quotation marks so that the line reads ("DABCO").

Col. 3, Line 45, please rewrite this line to read --to from about 0.01 to 5 percent based on the total--.

Col. 3, Line 46, please rewrite this line to read --weight of the sum of the weights of the polyols initially--.

Col. 4, Line 12, change "40'-bromo" to --4'-bromo--.

UNITED STATES PATENT AND TRADEMARK OFFICE
CERTIFICATE OF CORRECTION

PATENT NO. : 4,048,100

DATED : September 13, 1977

INVENTOR(S) : A. E. Gurgiolo and L. D. Booth

It is certified that error appears in the above-identified patent and that said Letters Patent are hereby corrected as shown below:

Col. 4, Line 25, change "as" to --was--.

Col. 5, Line 38, change "Example VI-IX" to --Examples VI-IX--.

Col. 5, Line 56, change "a NCO" to --an NCO--.

Col. 5, Line 64, change "stirren" to --stirred--.

Col. 6, Line 3, after "a" insert --one--.

Col. 7, Line 36, change "c is 2-4" to --c is 1-4--.

Col. 8, Line 5, change "claims" to --claim--.

Signed and Sealed this

Thirty-first Day of January 1978

[SEAL]

Attest:

RUTH C. MASON
*Attesting Officer*

LUTRELLE F. PARKER
*Acting Commissioner of Patents and Trademarks*